(12) United States Patent
Uan-Zo-li

(10) Patent No.: US 10,802,557 B2
(45) Date of Patent: Oct. 13, 2020

(54) SUPPORTING MAXIMUM POWER SPIKES ABOVE BATTERY CAPABILITY WITHOUT THROTTLING

(71) Applicant: Intel Corporation, Santa Clara, CA (US)

(72) Inventor: Alexander Uan-Zo-li, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 56 days.

(21) Appl. No.: 16/021,179

(22) Filed: Jun. 28, 2018

(65) Prior Publication Data

US 2020/0004306 A1    Jan. 2, 2020

(51) Int. Cl.
*G06F 1/26* (2006.01)
(52) U.S. Cl.
CPC ..................... *G06F 1/26* (2013.01)
(58) Field of Classification Search
CPC ........... G06F 1/263; G06F 1/266; H02J 7/345
See application file for complete search history.

(56) References Cited

U.S. PATENT DOCUMENTS

| 8,793,518 | B2 * | 7/2014 | Reddy ................. | G06F 1/3212 713/300 |
| 8,904,161 | B2 * | 12/2014 | Shim .................... | G11C 5/143 713/2 |
| 9,071,083 | B2 * | 6/2015 | Harris .................. | G06F 1/305 |
| 9,213,385 | B2 * | 12/2015 | Berke .................. | G06F 1/263 |
| 9,280,200 | B1 * | 3/2016 | Glassburn ............ | G06F 1/3221 |
| 9,748,787 | B2 * | 8/2017 | Thompson ........... | H02J 7/007 |
| 9,768,640 | B2 * | 9/2017 | Horie ................... | G06F 1/1626 |
| 9,778,950 | B2 * | 10/2017 | Yu ....................... | G06F 13/24 |
| 10,431,976 | B2 * | 10/2019 | Uan-Zo-li ............ | H02J 1/00 |
| 2009/0206657 | A1 * | 8/2009 | Vuk .................... | H01M 10/4264 307/9.1 |
| 2014/0181546 | A1 * | 6/2014 | Hallberg .............. | G06F 1/3206 713/320 |

(Continued)

FOREIGN PATENT DOCUMENTS

| JP | 2017126358 A | 7/2017 |
| WO | 2006076407 A1 | 7/2006 |

OTHER PUBLICATIONS

Intel, "7th Generation Intel Processor Families for H Platforms", Datasheet, vol. 1 of 2, 2017, 117 pages.

(Continued)

*Primary Examiner* — Brian T Misiura
(74) *Attorney, Agent, or Firm* — Jordan IP Law, LLC

(57) ABSTRACT

Systems, apparatuses and methods may provide for technology that supplements a battery coupled to a processor configuration with stored energy from a charger input, wherein the battery is supplemented with the stored energy in response to an increased power demand on the battery. The technology may also initiate one or more throttle operations in the processor configuration if the increased power demand does not end before the stored energy is depleted. If the increased power demand ends before the stored energy is depleted, the one or more throttle operations may be bypassed. The increased power demand may correspond to a system voltage being below a voltage threshold, a battery current being above a current threshold, and so forth.

24 Claims, 4 Drawing Sheets

(56) References Cited

U.S. PATENT DOCUMENTS

| | | | |
|---|---|---|---|
| 2014/0181547 A1* | 6/2014 | Hua | G06F 1/263 |
| | | | 713/320 |
| 2015/0275787 A1 | 10/2015 | Dufford et al. | |
| 2016/0164322 A1 | 6/2016 | Li et al. | |
| 2018/0022222 A1 | 1/2018 | Kusch et al. | |
| 2019/0041934 A1* | 2/2019 | Tan | G06F 1/263 |

OTHER PUBLICATIONS

U.S. Appl. No. 15/466,498, entitled "Mechanism to extend the peak power capability of a mobile platform", filed Mar. 22, 2017, 41 pages.

International Patent Application No. PCT/US17/54048, entitled "Peak power determination for an integrated circuit device", filed on Sep. 28, 2017, 44 pages.

International Search Report and Written Opinion for International Patent Application No. PCT/US2019/039775, dated Oct. 23, 2019, 10 pages.

\* cited by examiner

SUPPORTING MAXIMUM POWER SPIKES ABOVE BATTERY CAPABILITY WITHOUT THROTTLING

TECHNICAL FIELD

Embodiments generally relate to handling power spikes in battery-powered systems. More particularly, embodiments relate to supporting maximum power spikes above battery capability without throttling.

BACKGROUND

The tightly integrated nature of system on chip (SoC) architectures may make them useful in a wide variety of mobile platforms (e.g., systems, devices) having small form factors. During operation, however, the peak power demand from the processors, memory, input/output (TO) interfaces, etc., of a typical SoC, may exceed the power delivery capability of the platform battery. In such a case, the system voltage may drop below the minimum allowed system voltage of the platform (e.g., voltage "droop" may occur). Indeed, system voltages that are too low may prevent internal voltage regulators from operating correctly and ultimately lead to "black screening." While minimum voltage protections may be used to maintain acceptable system voltages, there remains considerable room for improvement. For example, one approach may be to immediately throttle the operation of the SoC in response to system voltage droop and place the SoC in a low frequency mode (LFM). Such a solution may have a negative impact on performance.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
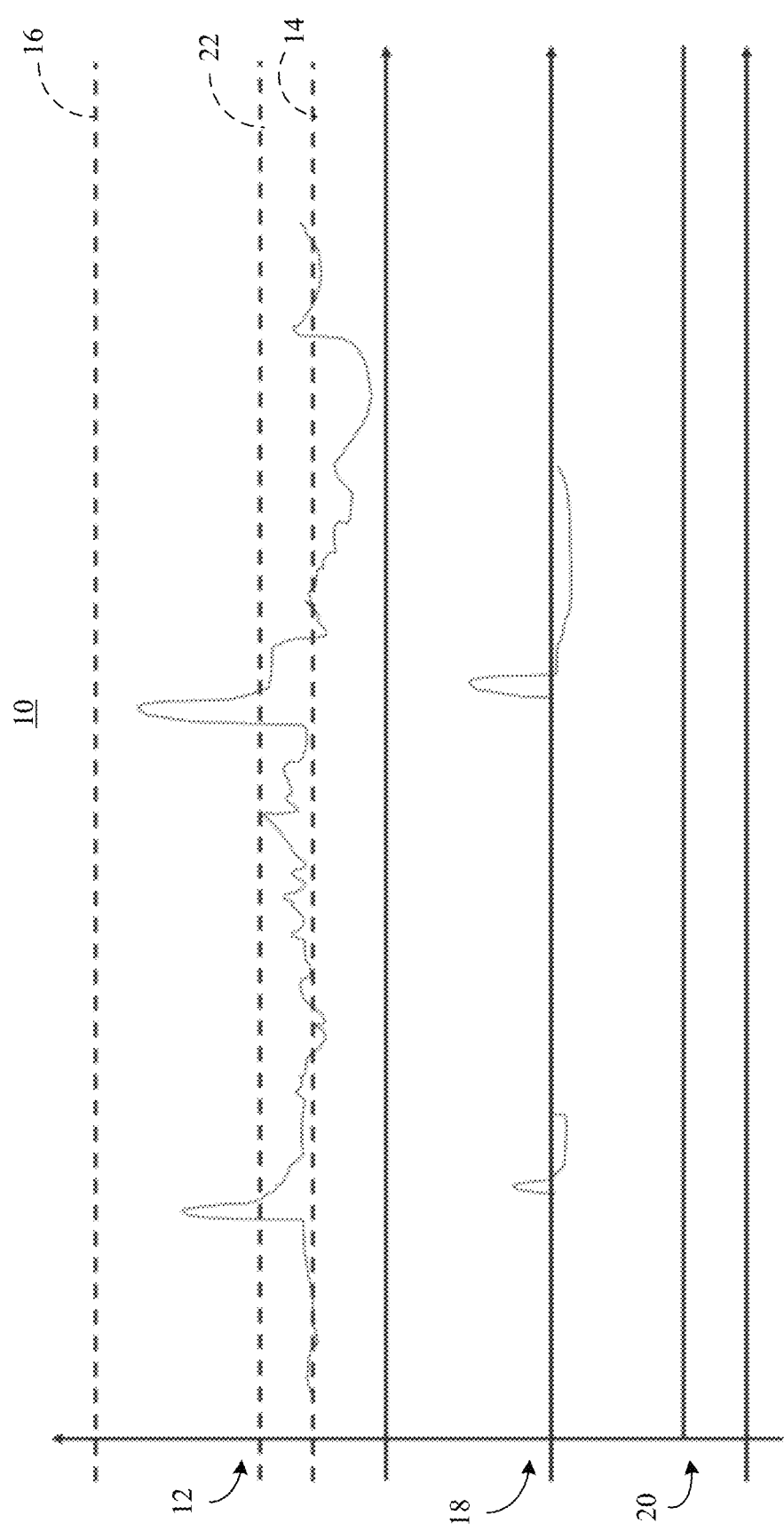
FIG. 1 is a plot of an example of a set of power curves and a throttle operation signal according to an embodiment.

Turning now to FIG. 1, a plot 10 of a load power curve 12 is shown for a system on chip (SoC). The SoC may include a processor configuration (e.g., host processor, graphics processor, input/output module, microcontroller, field programmable gate array/FPGA, etc.), memory (e.g., random access memory/RAM, read only memory/ROM, electrically erasable programmable ROM/EEPROM, flash memory, etc.), external interfaces (e.g., standardized or proprietary bus interfaces), analog-to-digital (A/D) converters, digital-to-analog (D/A) converters, voltage regulators, etc., or any combination thereof. In one example, the SoC is part of a battery-powered computing platform such as, for example, a notebook computer, tablet computer, convertible tablet, smart phone, personal digital assistant (PDA), wearable device, robot, media player, and so forth.

In the illustrated example, the load power curve 12 primarily remains near a relatively low power level 14 (e.g., power level two/PL2) and occasionally spikes toward a relatively high power level 16 (e.g., maximum power level four/PL4), where the relatively high power level 16 represents the maximum allowable power of the SoC. The spikes may be due to increases in the workload being handled by the processor configuration, input/output (IO) communications, memory operations, and so forth. Of particular note is that a throttle operation signal 20 (e.g., "Prochot #" signal that is low when asserted) is not asserted during the spikes of the load power curve 12. By contrast, a conventional solution might assert the throttle operation signal 20 whenever the load power curve 12 exceeds an intermediate power level 22 (e.g., power level that could be supported by the battery). Accordingly, in the illustrated example the processor configuration and/or other components of the SoC may continue to operate at their current frequencies and/or voltage levels during the illustrated spikes, which are of a relatively short duration (e.g., less than 1 ms). The result may be significantly enhanced performance (e.g., faster execution).

A charger power curve 18 demonstrates that concerns over exceeding the power delivery capability of the battery during the spikes may be obviated by enabling the charger to supplement the battery with stored energy from the input of the charger. Thus, the illustrated charger power curve 18 also exhibits spikes during the supplemental energy transfer. Once the illustrated load power curve 12 returns to the relatively low power level 14, the charger may replenish the stored energy from the battery, as indicated by the negative portions of the charger power curve 18. Accordingly, the illustrated solution eliminates performance degradations associated with unnecessary throttling and/or low frequency mode (LFM) operation, while exceeding the power delivery capability of the battery.

An additional advantage of the illustrated solution is that the relatively high power level 16 is independent of the number of throttle operations initiated in the processor configuration and/or SoC. In this regard, conventional solutions may count the number of Prochot # assertions and use a dynamic platform thermal framework (DPTF) to adjust the power level 16 based on the count. For example, if the Prochot # count exceeds some level (e.g., optimized for a given system/platform), the power level 16 reported to the SoC may be decreased. If the Prochot # count is below another limit, the power level 16 may be increased. Decreasing the power level 16 may reduce performance (e.g., less multi-threaded frequency operation) and may require additional system testing to determine the optimal number of Prochot # assertions for a range of battery states of charge, different benchmarks, etc. By contrast, the illustrated approach minimizes the relationship between the power level 16 and the number of Prochot # assertions. Accordingly, a higher power level 16 may be used, which leads to enhanced performance (e.g., faster execution). Additionally, the elimination of benchmark testing to determine the optimal number of Prochot # assertions reduces cost and the development life cycle.

Figure 2:
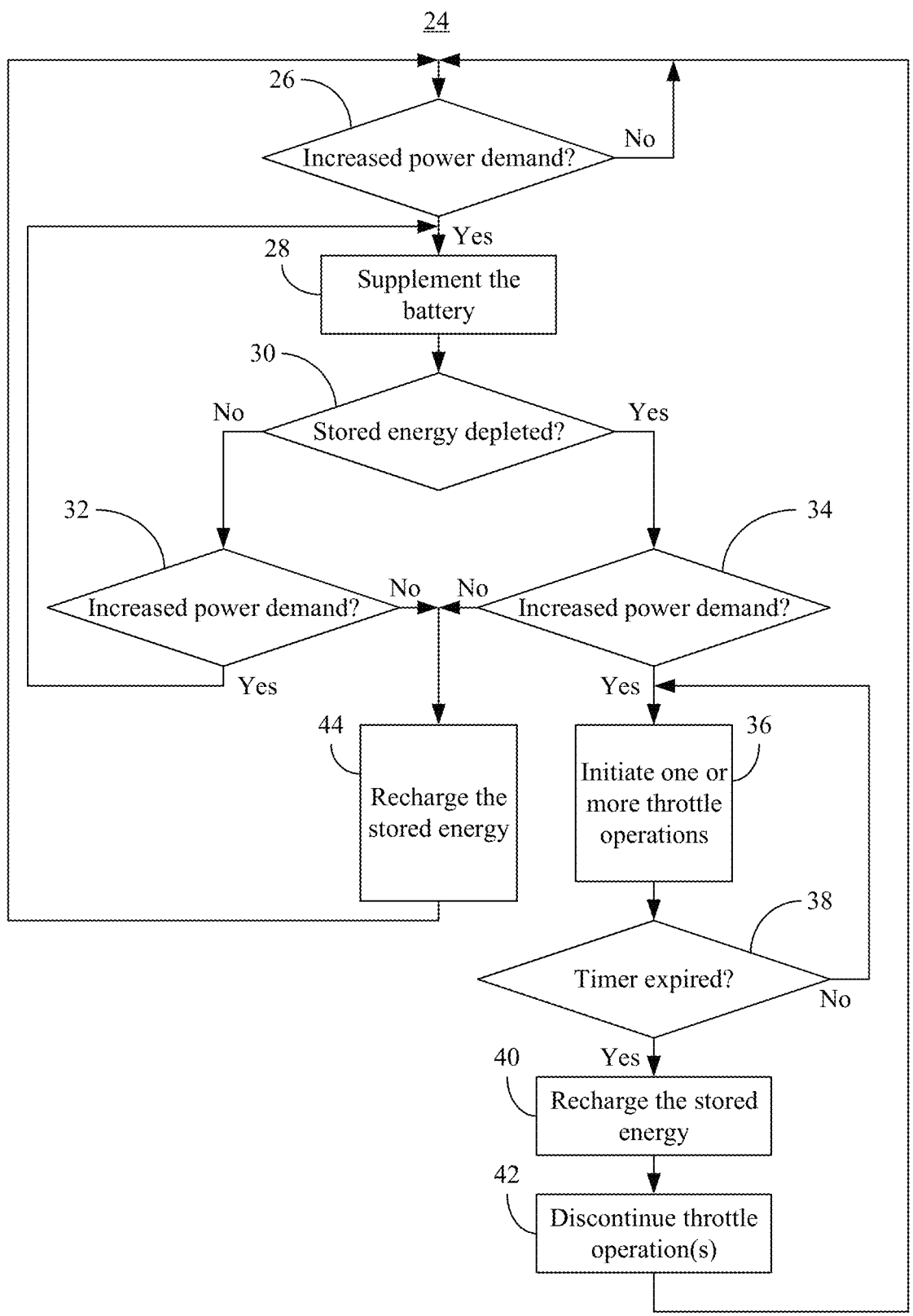
FIG. 2 is a flowchart of an example of a method of operating a charger according to an embodiment.

FIG. 2 shows a method 24 of operating a charger. The method 24 may be implemented in one or more modules as a set of logic instructions stored in a machine- or computer-readable storage medium such as RAM, ROM, programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 24 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 26 determines (e.g., via a comparator) whether an increased power demand is placed on a battery coupled to a processor configuration and/or SoC. Block 26 might include, for example, determining whether the system voltage (e.g., $V_{sys}$) of the processor configuration and/or SoC is below a threshold voltage (e.g., Val) and/or determining whether the battery current is above a current threshold. If an increased power demand is not placed on the battery, the illustrated method 24 enters a wait state until the increased power demand is placed on the battery (e.g., the system voltage drops below the voltage threshold and/or the battery current exceeds the current threshold). Block 28 supplements the battery with stored energy from a charger input decoupling in response to the increased power demand on the battery. Block 28 may include transferring the stored energy from a capacitor coupled to the charger input. In this regard, the charger may keep the capacitor charged to a certain level (e.g., 20V) while the processor configuration, SoC and/or computing platform are in an active mode.

A determination is made at illustrated block 30 as to whether the stored energy has been depleted (e.g., the input capacitor has negligible or no charge). If so, block 34 determines whether the increased power demand still exists (e.g., the system voltage is below the voltage threshold and/or the battery current is above the current threshold). If the increased power demand is placed on the battery, block 36 may initiate one or more throttle operations in the processor configuration and/or SoC. In one example, block 36 asserts a Prochot # signal to the SoC, although other throttling solutions (e.g., frequency scaling, voltage scaling, clock gating) may be used. The Prochot # signal is a request to the SoC to throttle its operation. Illustrated block 38 determines whether a timer (e.g., 10 μs) has expired. If the timer has not expired, the method 24 may return to block 36. The values used herein are to facilitate discussion only and may vary depending on the circumstances.

If it is determined at block 38 that the timer has expired, it may be assumed that the throttling operations have had enough time to take effect (e.g., reduce the power demand of the processor configuration and/or SoC) and block 40 recharges the stored energy at the charger input. Block 40 may include transferring energy from the battery to a capacitor coupled to the charger input (e.g., input decoupling capacitor). Additionally, the throttle operations may be discontinued at block 42. In one example, block 42 includes de-asserting a Prochot # signal once the charger decoupling has been re-charged to a given level. The method 24 then returns to block 26.

If it is determined at block 34 that the increased power demand on the battery does not exist (e.g., the system voltage is not below the voltage threshold, the battery current is not above the current threshold, and/or the power spike is over), illustrated block 44 bypasses the throttle operations of block 36 and recharges the stored energy at the charger input. Bypassing the throttle operations as shown eliminates performance degradations associated with unnecessary throttling and/or low frequency mode (LFM) operation. In this regard, the supplemental stored energy may be used to help power the processor configuration and/or SoC long enough for the power spike to end, while eliminating concerns over the power delivery capability of the battery being exceeded. As already noted, block 44 might include transferring energy from the battery to a capacitor coupled to the charger input. Once the stored energy is recharged, the method 24 returns to block 26.

If it is determined at block 30 that the stored energy has not been depleted (e.g., the input capacitor still retains some charge), block 32 determines whether the increased power demand still exists (e.g., the system voltage is below the threshold and/or the battery current is above the current threshold). If the increased power demand is placed on the battery, the power spike is over and the method 24 proceeds to block 44, which bypasses the throttle operations of block 36 and recharges the stored energy. Again, bypassing the throttle operations as shown may eliminate performance degradations associated with unnecessary throttling and/or LFM operation. Moreover, the supplemental stored energy may be used to help power the processor configuration and/or SoC long enough for the power spike to end, while eliminating concerns over the power delivery capability of the battery being exceeded. If it is determined at block 32 that the system voltage is below the threshold, the illustrated method 24 returns to block 28.

Figure 3:
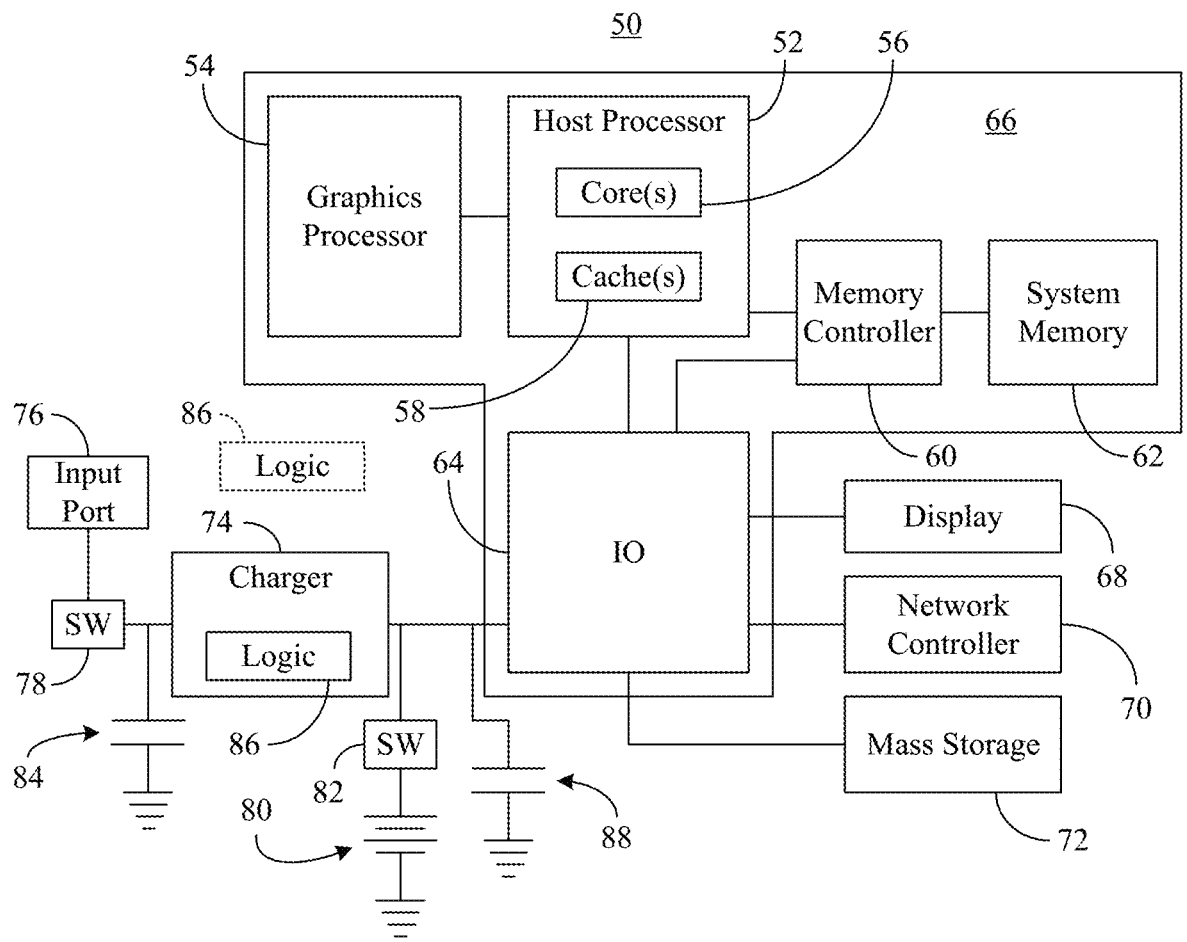
FIG. 3 is a block diagram of an example of a computing platform according to an embodiment.

FIG. 3 shows a computing platform 50 that may generally be part of an electronic device/system having computing functionality (e.g., PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), etc., or any combination thereof. In the illustrated example, the platform 50 includes a graphics processor 54 (e.g., graphics processing unit/GPU) and a host processor 52 (e.g., central processing unit/CPU) having one or more cores 56 and one or more caches 58. The platform 50 may also include a memory controller 60 that is coupled to a system memory 62.

The illustrated platform 50 also includes an input output (IO) module 64 implemented together with the host processor 52, the graphics processor 54, the memory controller 60 and the system memory 62 on an SoC 66 (e.g., semiconductor die). The graphics processor 54, the host processor 52, the memory controller 60 and the IO module 64 may represent a processor configuration that is capable of handling a wide variety of operations. In one example, the IO module 64 communicates with a display 68 (e.g., touch screen, liquid crystal display/LCD, light emitting diode/LED display), a network controller 70 (e.g., wired and/or wireless), mass storage 72 (e.g., hard disk drive/HDD, optical disk, solid state drive/SSD, flash memory), and a charger 74. The platform 50 also includes a system decoupling capacitor 88 (e.g., $C_{sys}$) coupled to the input of the SoC 66.

The charger 74 may in turn be coupled to an input port 76 such as, for example a USB (e.g., Universal Serial Bus Type-C Cable and Connector Specification, Rev. 1.0, Aug. 11, 2014, USB Implementers Forum) port via a switch 78 (field effect transistor/FET). The charger 74 and the SoC 66 are also coupled to a battery 80 (e.g., two cells in series, or "2S") via a switch 82 (FET). The voltage supplied to the SoC 66 is typically less than the ideal voltage of the battery 80 due to the resistance of various platform components such as, for example, the cells of the battery 80, the battery 80 itself, connectors, the motherboard to which the SoC 66 is mounted, and so forth. A capacitor 84 (charger input decoupling capacitor, e.g., $C_{in}$) is coupled to an input of the charger 74, where the charger 74 may generally keep the capacitor 84 charged to a certain level (e.g., 20V) while the processor configuration, SoC 66 and/or computing platform 50 are in an active mode (e.g., not in a connected standby power state such as S0ix or Sx of the Advanced Configuration and Power Interface/ACPI Specification, Rev. 6.2, May 2017).

The illustrated charger 74 includes logic 86 (e.g., logic instructions, configurable logic, fixed-functionality hardware logic, etc., or any combination thereof) to perform one or more aspects of the method 24 (FIG. 2), already discussed. In one example, the logic 86 is a controller such as, for example, a charger controller or a battery controller. Thus, the logic 86 may supplement the battery 80 with stored energy from the input capacitor 84, wherein the battery 80 is supplemented with the stored energy in response to an increased power demand on the battery 80. The increased power demand may correspond to a system voltage associated with the processor configuration and/or SoC 66 being below a voltage threshold. The increased power demand may also correspond to the current from the battery 80 being above a current threshold. In one example, the increased power demand may exceed the power delivery capability of the battery 80. Thus, supplementing the battery 80 with the stored energy keeps the voltage regulators of the SoC 66 in the normal operating range and prevents the display 68 from black screening. The logic 86 may also initiate one or more throttle operations in the processor configuration and/or SoC 66 if the system voltage does not exceed the voltage threshold before the stored energy is depleted.

Additionally, the logic 86 bypasses the throttle operation(s) if the increased power demand does not end before the stored energy is depleted. For example, the system voltage may exceed the voltage threshold prior to the processor configuration and/or SoC 66 entering an LFM. Similarly, the battery current may fall below the current threshold prior to the processor configuration and/or SoC 66 entering the LFM. Bypassing the throttle operation(s) and eliminating LFM operation may substantially enhance performance. Moreover, the supplemental stored energy may be used to help power the processor configuration and/or SoC 66 long enough for the power spike to end, while eliminating concerns over the power delivery capability of the battery being exceeded. Additionally, the maximum power level associated with the battery 80 may be independent of the number of throttle operations initiated in the processor configuration and/or SoC 66, as already discussed. Although the logic 86 is shown as being located in the charger 74, the logic 86 may be located elsewhere in the computing platform 50 such as, for example, on the SoC 66. The processor configuration of the SoC 66 may also execute instructions retrieved from the cache(s) 58, the system memory 62 and/or the mass storage 72 to perform one or more aspects of the method 24 (FIG. 2), already discussed.

Figure 4:
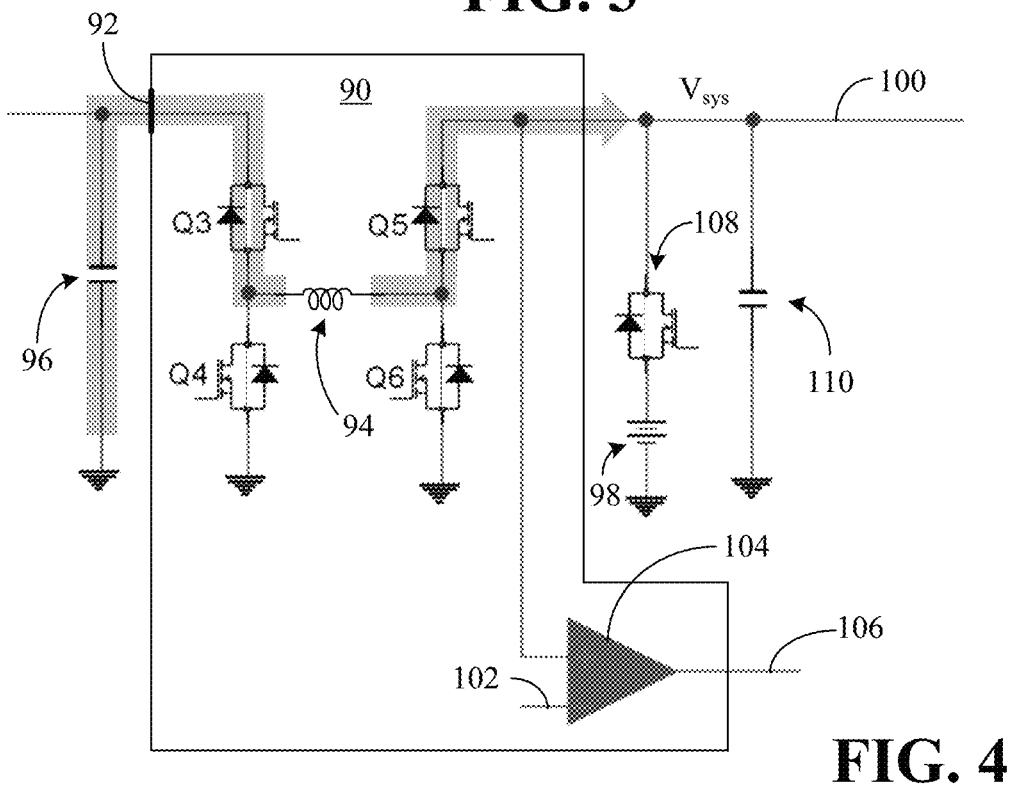
FIG. 4 is a circuit schematic of an example of a charger according to an embodiment.

Turning now to FIG. 4, a charger 90 (e.g., buck-boost converter in this case, but a buck converter could also be utilized) is shown in greater detail. The charger 90 may be readily substituted for the charger 74 (FIG. 3), already discussed. In the illustrated example, the charger 90 includes a charger input 92, an inductor 94 and a switch configuration (Q3, Q4, Q5, Q6) to supplement a battery 98 coupled to a processor configuration and/or SoC with stored energy from a capacitor 96 coupled to the charger input 92. The battery 98 is supplemented with the stored energy in response to an increased power demand on the battery 98. As already noted, the increased power demand may correspond to a system voltage 100 ($V_{sys}$) associated with the processor configuration and/or SoC being below a voltage threshold 102, the current from the battery 98 being above a current threshold, and so forth. The system voltage being below the voltage threshold and/or the battery current being above the current threshold may correspond to an increase in power consumption of the rest of the platform (e.g., memory or storage), wherein the increased power demand exceeds the power delivery capability of the battery 98.

A controller such as, for example, a comparator 104 initiates one or more throttle operations in the processor configuration and/or SoC by asserting a Prochot # signal 106 if the increased power demand does not end before the stored energy is depleted. The illustrated comparator 104 bypasses the throttle operation(s) if the increased power demand ends before the stored energy is depleted. In one example, the increased power demand ends prior to the processor configuration entering LFM. Moreover, a maximum power level associated with the illustrated battery 98 is independent of the number of throttle operations initiated in the processor configuration and/or the Soc. The illustrated switch configuration also recharges the stored energy in response to the system voltage exceeding the voltage threshold. The controller may also operate the switch configuration and/or other switches such as a battery switch 108.

It has been determined that it may be more effective to store energy in the charger input decoupling capacitor 84 than a system decoupling capacitor 110 because the capacitor 84 might be dischargeable from 20V to 6V or lower, whereas the capacitor 110 may be dischargeable from the throttle operation threshold level (e.g., approximately 6V) to the system minimum voltage (e.g., approximately 5.6V). In such a case, in order to supplement the battery 98, 1 µF of decoupling at the input 92 of the charger 90 would be equivalent to 78 µF of the decoupling at the input of the SoC. Accordingly, the illustrated solution also provides considerable cost and integrated circuit size benefits.

Figure 5:
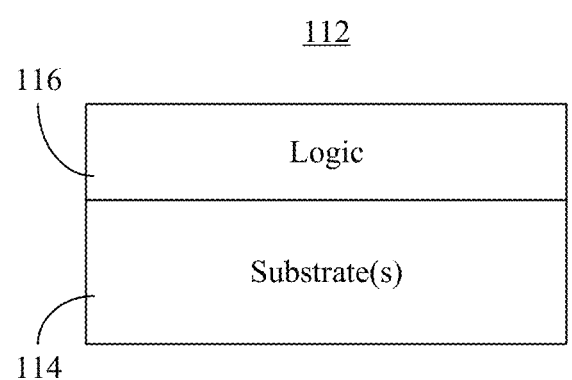
FIG. 5 is an illustration of an example of a semiconductor apparatus according to an embodiment.

FIG. 5 shows a semiconductor package apparatus 112. The apparatus 112 may be readily substituted for the SoC 66 (FIG. 3), already discussed. The illustrated apparatus 112 includes one or more substrates 114 (e.g., silicon, sapphire, gallium arsenide) and logic 116 (e.g., transistor array and other integrated circuit/IC components) coupled to the substrate(s) 114. The logic 116 may be implemented at least partly in configurable logic or fixed-functionality hardware logic. The logic 116 may generally implement one or more aspects of the method 24 (FIG. 2), already discussed. Accordingly, the logic 116 may supplement a battery coupled to a processor configuration with stored energy from a charger input, wherein the battery is to be supplemented with the stored energy in response to an increased power demand on the battery. The increased power demand may exceed the power delivery capability of the battery.

Additionally, the logic 116 may initiate one or more throttle operations in the processor configuration if the increased power demand does not end before the stored energy is depleted. Moreover, the logic 116 may bypass the throttle operation(s) if the increased power demand ends before the storage energy is depleted. In one example, the increased power demand ends prior to the processor configuration entering a LFM. A maximum power level associated with the battery may be independent of the number of throttle operation(s) initiated in the processor configuration.

In one example, the logic 116 includes transistor channel regions that are positioned (e.g., embedded) within the substrate(s) 114. Thus, the interface between the logic 116 and the substrate(s) 114 may not be an abrupt junction. The logic 116 may also be considered to include an epitaxial layer that is grown on an initial wafer of the substrate(s) 114.

Additional Notes and Examples

Example 1 may include a performance-enhanced computing platform comprising a system on chip (SoC) including a processor configuration, a display coupled to the SoC, and a charger coupled to the SoC, the charger including a charger input, and a switch configuration to supplement a battery coupled to the SoC with stored energy from the charger input, wherein the battery is to be supplemented with the stored energy in response to an increased power demand on the battery, and a controller to initiate one or more throttle operations in the SoC if the increased power demand does not end before the stored energy is depleted, and to bypass the one or more throttle operations if the increased power demand ends before the stored energy is depleted.

Example 2 may include the computing platform of Example 1, wherein the increased power demand ends prior to the SoC entering a low frequency mode.

Example 3 may include the computing platform of Example 1, wherein the switch configuration is to recharge the stored energy in response to the increased power demand ending.

Example 4 may include the computing platform of Example 1, wherein the increased power demand corresponds to one or more of a system voltage being below a voltage threshold or a battery current being above a current threshold, and wherein the increased power demand exceeds a power delivery capability of the battery.

Example 5 may include the computing platform of Example 1, further including a capacitor coupled to the charger input, wherein the stored energy is to be supplemented from the capacitor.

Example 6 may include the computing platform of Example 1, wherein a maximum power level associated with the battery is to be independent of a number of the one or more throttle operations initiated in the SoC.

Example 7 may include an apparatus comprising a charger input, a switch configuration to supplement a battery coupled to a processor configuration with stored energy from the charger input, wherein the battery is to be supplemented with the stored energy in response to an increased power demand on the battery, and a controller to initiate one or more throttle operations in the processor configuration if the increased power demand does not end before the stored energy is depleted, and to bypass the one or more throttle operations if the increased power demand ends before the stored energy is depleted.

Example 8 may include the apparatus of Example 7, wherein the increased power demand ends prior to the processor configuration entering a low frequency mode.

Example 9 may include the apparatus of Example 7, wherein the switch configuration is to recharge the stored energy in response to the increased power demand ending.

Example 10 may include the apparatus of Example 7, wherein the increased power demand corresponds to one or more of a system voltage being below a voltage threshold or a battery current being above a current threshold, and wherein the increased power demand exceeds a power delivery capability of the battery.

Example 11 may include the apparatus of Example 7, wherein the stored energy is to be supplemented from a capacitor coupled to the charger input.

Example 12 may include the apparatus of Example 7, wherein a maximum power level associated with the battery is to be independent of a number of the one or more throttle operations initiated in the processor configuration.

Example 13 may include a method comprising supplementing a battery coupled to a processor configuration with stored energy from a charger input, wherein the battery is supplemented with the stored energy in response to an increased power demand on the battery, initiating one or more throttle operations in the processor configuration if the increased power demand does not end before the stored energy is depleted, and bypassing the one or more throttle operations if the increased power demand ends before the stored energy is depleted.

Example 14 may include the method of Example 13, wherein the increased power demand ends prior to the processor configuration entering a low frequency mode.

Example 15 may include the method of Example 13, further including recharging the stored energy in response to the increased power demand ending.

Example 16 may include the method of Example 13, wherein the increased power demand corresponds to one or more of a system voltage being below a voltage threshold or a battery current being above a current threshold, and wherein the increased power demand exceeds a power delivery capability of the battery.

Example 17 may include the method of Example 13, wherein the stored energy is supplemented from a capacitor coupled to charger input.

Example 18 may include the method of Example 13, wherein a maximum power level associated with the battery is independent of a number of the one or more throttle operations initiated in the processor configuration.

Example 19 may include at least one computer readable storage medium comprising a set of instructions, which when executed by a computing platform, cause the computing platform to supplement a battery coupled to a processor configuration with stored energy from a charger input, wherein the battery is to be supplemented with the stored energy in response to an increased power demand on the battery, initiate one or more throttle operations in the processor configuration if the increased power demand does not end before the stored energy is depleted, and bypass the one or more throttle operations if the increased power demand ends before the stored energy is depleted.

Example 20 may include the at least one computer readable storage medium of Example 19, wherein the increased power demand ends prior to the processor configuration entering a low frequency mode.

Example 21 may include the at least one computer readable storage medium of Example 19, wherein the instructions, when executed, cause the computing platform to recharge the stored energy in response to the increased power demand ending.

Example 22 may include the at least one computer readable storage medium of Example 19, wherein the increased power demand corresponds to one or more of a system voltage being below a voltage threshold or a battery current being above a current threshold, and wherein the increased power demand exceeds a power delivery capability of the battery.

Example 23 may include the at least one computer readable storage medium of Example 19, wherein the stored energy is to be supplemented from a capacitor coupled to the charger input.

Example 24 may include the at least one computer readable storage medium of Example 19, wherein a maximum power level associated with the battery is to be independent of a number of the one or more throttle operations initiated in the processor configuration.

Thus, technology described herein may use active minimum voltage protection in lieu of throttling, while supplementing battery power and enabling the SoC peak power to exceed the capability of the battery. Accordingly, unnecessary throttling to LFM may be avoided. The technology may be used in systems with relatively fast throttling to LFM as well as in systems that may, in some state of charge, have a sufficient drop in the SoC power for less than, for example, 10 µs.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/ or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

I claim:

1. A computing platform comprising:
a system on chip (SoC) including a processor configuration;
a display coupled to the SoC; and
a charger coupled to the SoC, the charger including:
a charger input, and
a switch configuration to supplement a battery coupled to the SoC with stored energy from the charger input, wherein the battery is to be supplemented with the stored energy in response to an increase in a power demand on the battery; and
a controller to:
if the increase in the power demand does not end before the stored energy is depleted, initiate one or more throttle operations in the SoC to reduce the power demand, start a timer, cause the switch configuration to recharge the stored energy at the charger input in response to an expiration of the timer while the power demand is reduced by the one or more throttle operations and discontinue the one or more throttle operations when the stored energy at the charger input is recharged, and
bypass the one or more throttle operations if the increase in the power demand ends before the stored energy is depleted.

2. The computing platform of claim 1, wherein the increase in the power demand ends prior to the SoC entering a low frequency mode.

3. The computing platform of claim 1, wherein the switch configuration is to recharge the stored energy in response to the increase in the power demand ending.

4. The computing platform of claim 1, wherein the increase in the power demand corresponds to one or more of a system voltage being below a voltage threshold or a battery current being above a current threshold, and wherein the increase in the power demand exceeds a power delivery capability of the battery.

5. The computing platform of claim 1, further including a capacitor coupled to the charger input, wherein the stored energy is to be supplemented from the capacitor.

6. The computing platform of claim 1, wherein a maximum power level associated with the battery is to be independent of a number of the one or more throttle operations initiated in the SoC.

7. An apparatus comprising:
a charger input;
a switch configuration to supplement a battery coupled to a processor configuration with stored energy from the charger input, wherein the battery is to be supplemented with the stored energy in response to an increase in a power demand on the battery; and
a controller to:
if the increase in the power demand does not end before the stored energy is depleted, initiate one or more throttle operations in the processor configuration to reduce the power demand, start a timer, cause the switch configuration to recharge the stored energy at the charger input in response to an expiration of the timer while the power demand is reduced by the one or more throttle operations and discontinue the one or more throttle operations when the stored energy at the charger input is recharged, and
bypass the one or more throttle operations if the increase in the power demand ends before the stored energy is depleted.

8. The apparatus of claim 7, wherein the increase in the power demand ends prior to the processor configuration entering a low frequency mode.

9. The apparatus of claim 7, wherein the switch configuration is to recharge the stored energy in response to the increase in the power demand ending.

10. The apparatus of claim 7, wherein the increase in the power demand corresponds to one or more of a system voltage being below a voltage threshold or a battery current being above a current threshold, and wherein the increase in the power demand exceeds a power delivery capability of the battery.

11. The apparatus of claim 7, wherein the stored energy is to be supplemented from a capacitor coupled to the charger input.

12. The apparatus of claim 7, wherein a maximum power level associated with the battery is to be independent of a number of the one or more throttle operations initiated in the processor configuration.

13. A method comprising:
supplementing a battery coupled to a processor configuration with stored energy from a charger input, wherein the battery is supplemented with the stored energy in response to an increase in a power demand on the battery;
if the increase in the power demand does not end before the stored energy is depleted, initiating one or more throttle operations in the processor configuration to reduce the power demand, starting a timer, recharging the stored energy at the charger input in response to an expiration of the timer while the power demand is reduced by the one or more throttle operations and discontinuing the one or more throttle operations when the stored energy at the charger input is recharged; and
bypassing the one or more throttle operations if the increase in the power demand ends before the stored energy is depleted.

14. The method of claim 13, wherein the increase in the power demand ends prior to the processor configuration entering a low frequency mode.

15. The method of claim 13, further including recharging the stored energy in response to the increase in the power demand ending.

16. The method of claim 13, wherein the increase in the power demand corresponds to one or more of a system voltage being below a voltage threshold or a battery current being above a current threshold, and wherein the increase in the power demand exceeds a power delivery capability of the battery.

17. The method of claim 13, wherein the stored energy is supplemented from a capacitor coupled to the charger input.

18. The method of claim 13, wherein a maximum power level associated with the battery is independent of a number of the one or more throttle operations initiated in the processor configuration.

19. At least one computer readable storage medium comprising a set of instructions, which when executed by a computing platform, cause the computing platform to:
supplement a battery coupled to a processor configuration with stored energy from a charger input, wherein the battery is to be supplemented with the stored energy in response to an increase in a power demand on the battery;
if the increase in the power demand does not end before the stored energy is depleted, initiate one or more throttle operations in the processor configuration to reduce the power demand, start a timer, recharge the stored energy at the charger input in response to an expiration of the timer while the power demand is reduced by the one or more throttle operations and discontinue the one or more throttle operations when the stored energy at the charger input is recharged; and
bypass the one or more throttle operations if the increase in the power demand ends before the stored energy is depleted.

20. The at least one computer readable storage medium of claim 19, wherein the increase in the power demand ends prior to the processor configuration entering a low frequency mode.

21. The at least one computer readable storage medium of claim 19, wherein the instructions, when executed, cause the computing platform to recharge the stored energy in response to the increase in the power demand ending.

22. The at least one computer readable storage medium of claim 19, wherein the increase in the power demand corresponds to one or more of a system voltage being below a voltage threshold or a battery current being above a current threshold, and wherein the increase in the power demand exceeds a power delivery capability of the battery.

23. The at least one computer readable storage medium of claim 19, wherein the stored energy is to be supplemented from a capacitor coupled to the charger input.

24. The at least one computer readable storage medium of claim 19, wherein a maximum power level associated with the battery is to be independent of a number of the one or more throttle operations initiated in the processor configuration.

* * * * *